US010801909B2

(12) United States Patent
Lin et al.

(10) Patent No.: US 10,801,909 B2
(45) Date of Patent: Oct. 13, 2020

(54) DEVICE FOR MEASURING AND ADJUSTING INERTIA OF TEST MODEL OF OFFSHORE STRUCTURE AND METHOD FOR USING THE SAME

(71) Applicant: Dalian University of Technology, Dalian (CN)

(72) Inventors: Yan Lin, Dalian (CN); Xiaoning Jiang, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 121 days.

(21) Appl. No.: 16/147,866

(22) Filed: Sep. 30, 2018

(65) Prior Publication Data

US 2019/0033157 A1 Jan. 31, 2019

Related U.S. Application Data

(63) Continuation-in-part of application No. PCT/CN2017/078084, filed on Mar. 24, 2017.

(30) Foreign Application Priority Data

May 11, 2016 (CN) .......................... 2016 1 0306285

(51) Int. Cl.
*G01M 1/12* (2006.01)
*G01G 19/414* (2006.01)
*G01G 19/00* (2006.01)
*G01M 1/10* (2006.01)

(52) U.S. Cl.
CPC .............. *G01M 1/12* (2013.01); *G01G 19/00* (2013.01); *G01G 19/414* (2013.01); *G01M 1/10* (2013.01); *G01M 1/122* (2013.01)

(58) Field of Classification Search
CPC .......... G01M 1/12; G01M 1/122; G01M 1/16; G01M 1/20; G01M 1/32; G01M 1/10
USPC .................................................... 177/201–237
See application file for complete search history.

(56) References Cited

U.S. PATENT DOCUMENTS

| 3,388,589 A | * | 6/1968 | Campbell | ............... G01M 1/12 |
| | | | | 73/65.01 |
| 3,693,413 A | * | 9/1972 | Boynton | .................. G01M 1/10 |
| | | | | 73/65.08 |
| 3,869,007 A | * | 3/1975 | Haggstrom | .......... G01G 3/1408 |
| | | | | 177/211 |

(Continued)

*Primary Examiner* — Tran M. Tran
(74) *Attorney, Agent, or Firm* — Matthias Scholl P.C.; Matthias Scholl (57) ABSTRACT

A device including a measuring instrument, supporting mechanisms, a swinging mechanism, and a rotating mechanism. The measuring instrument includes an angle sensor and a pressure sensor. The supporting mechanisms are symmetrically disposed at two ends of the swing mechanism. The supporting mechanisms each include a support frame, a base frame, a bracket, and a bracket support. The support frame is disposed on the base frame. The bracket support is disposed on the support frame. The bracket is slidably disposed on the bracket support via locating pins. The swinging mechanism includes a first swing frame, a second swing frame, and a rotary table base disposed between the first swing frame and the second swing frame. The rotating mechanism includes a rotary table. The rotary table is wheel-shaped and includes a rotating shaft and a plurality of radial supporting rods.

4 Claims, 9 Drawing Sheets

(56) References Cited

U.S. PATENT DOCUMENTS

| | | | | |
|---|---|---|---|---|
| 4,991,437 A * | 2/1991 | Hanchett | ............... | G01M 1/12 |
| | | | | 269/254 CS |
| 5,038,604 A * | 8/1991 | Rollet | ............... | G01M 1/122 |
| | | | | 73/65.07 |
| 5,081,865 A * | 1/1992 | Schechter | ............ | G01M 1/122 |
| | | | | 73/483 |
| 5,177,998 A * | 1/1993 | Monk | ................. | G01M 1/10 |
| | | | | 73/65.07 |
| 6,137,065 A * | 10/2000 | Zefira | ............... | G01G 23/002 |
| | | | | 177/210 R |
| 7,278,295 B2 * | 10/2007 | Mastinu | ............... | G01M 1/10 |
| | | | | 73/65.08 |
| 7,855,343 B2 * | 12/2010 | Nakagawa | ............ | B65G 69/16 |
| | | | | 177/25.18 |
| 8,505,373 B2 * | 8/2013 | Goertz | ............... | G01M 1/10 |
| | | | | 73/116.01 |
| 8,701,472 B2 * | 4/2014 | Wurst | ............... | B66C 13/08 |
| | | | | 73/65.07 |
| 9,188,503 B2 * | 11/2015 | Kloepper | ............ | G01M 7/025 |
| 9,417,151 B2 * | 8/2016 | Fordice | ............... | G01M 1/122 |
| 9,714,880 B2 * | 7/2017 | Park | ................... | G01M 1/122 |
| 9,846,100 B2 * | 12/2017 | Klopper | ............... | G01B 11/14 |
| 9,933,324 B2 * | 4/2018 | Trinko | ............... | G01M 1/122 |
| 9,952,249 B2 * | 4/2018 | Miyaji | ............... | G01P 15/0802 |
| 10,040,514 B1 * | 8/2018 | Lin | ................... | G01M 10/00 |
| 10,197,468 B2 * | 2/2019 | Klopper | ............... | G01M 1/10 |
| 10,337,943 B2 * | 7/2019 | Eberle | ............... | B04B 9/12 |
| 10,539,479 B2 * | 1/2020 | Klopper | ............... | G01M 1/122 |

\* cited by examiner

DEVICE FOR MEASURING AND ADJUSTING INERTIA OF TEST MODEL OF OFFSHORE STRUCTURE AND METHOD FOR USING THE SAME

CROSS-REFERENCE TO RELATED APPLICATIONS

This application is a continuation-in-part of International Patent Application No. PCT/CN2017/078084 with an international filing date of Mar. 24, 2017, designating the United States, now pending, and further claims foreign priority benefits to Chinese Patent Application No. 201610306285.0 filed May 11, 2016. The contents of all of the aforementioned applications, including any intervening amendments thereto, are incorporated herein by reference.

BACKGROUND

This disclosure relates to a device for measuring and adjusting the inertia of a test model of an offshore structure and a method for using the same.

Offshore structures are erected up in a marine environment for the production and transmission of electricity, oil, gas, and other resources.

In the design process, the performance parameters of the offshore structures are measured using a test model. During testing, the weight, center-of-gravity, and rotary inertia of the test model are adjusted to correspond to that of an actual offshore structure. However, conventional test models are bulky, difficult to assemble and operate.

SUMMARY

Disclosed is a device for measuring and adjusting the inertia of a test model of an offshore structure.

The disclosure provides a device for measuring and adjusting the inertia of a test model of an offshore structure, the device comprising a measuring instrument, supporting mechanisms, a swinging mechanism, and a rotating mechanism. The measuring instrument comprises an angle sensor and a pressure sensor. The supporting mechanisms are symmetrically disposed at two ends of the swing mechanism.

The supporting mechanisms each comprise a support frame, a base frame, a bracket, and a bracket support; the support frame is disposed on the base frame; the bracket support is disposed on the support frame; the bracket is slidably disposed on the bracket support via locating pins; and a groove is disposed on the top surface of the bracket.

The swinging mechanism comprises a first swing frame, a second swing frame, and a rotary table base disposed between the first swing frame and the second swing frame; the first swing frame and the second swing frame each comprises a vertically disposed triangle member, and a suspension pin is disposed at a vertex of the triangle member; the suspension pin is inserted in the groove of the bracket of the support frame to connect the supporting mechanisms and the swing mechanism; the first swing frame comprises a first sleeve rod, and the second swing frame comprises a second sleeve rod; the rotary table base is centrosymmetric, and comprises an axle hole, a third sleeve rod, a side wall, and a spring pin disposed on the side wall; the first sleeve rod and the second sleeve rod are inserted in the third sleeve rod, and then are locked using fastening bolts.

The rotating mechanism comprises a rotary table; the rotary table is wheel-shaped, and comprises a rotating shaft and a plurality of radial supporting rods; the rotating shaft of the rotary table is inserted in the axle hole of the rotary table base; a side wall of each radial supporting rod comprises a protrusion, the protrusion comprises a through hole, and the spring pin of the rotary table base is inserted in the through hole to fix the rotary table base and the rotary table.

The angle sensor can be disposed on the swing mechanism, and the pressure sensor can be disposed between the bracket and the bracket support; and the angle sensor and the pressure sensor can communicate with a signal acquisition unit.

The support frame and the base frame can employ hollow square tubes.

Four locating pins can be disposed between the bracket and the bracket support.

The included angle between two adjacent radial supporting rods can be 30 degrees.

Also disclosed is a method of using the device for measuring and adjusting the inertia of a test model of an offshore structure, the method comprising:

1) measuring transverse and longitudinal lengths of the test model, and determining the length of the swinging mechanism according to the longitudinal length of the test model; centering the rotary table base on the swing mechanism; connecting and fixing the first swing frame, the second swing frame, and the rotary table base using the fastening bolt according to the length of the swinging mechanism; disposing the angle sensor on the first swing frame; installing the pressure sensor between the bracket and the bracket support; connecting the angle sensor and the pressure sensor to a signal acquisition unit; disposing and fixing the rotating mechanism on the rotary table base; hoisting the swinging mechanism and the rotating mechanism on the supporting mechanisms;

2) recording data on the pressure sensor and calculating the weight of the swinging mechanism; exerting a constant force on the swinging mechanism to deflect the swinging mechanism, and calculating the vertical center-of-gravity position of the swinging mechanism according to the moment balance principle; exerting an external force on the swinging mechanism to swing the swinging mechanism, recording data of the angle sensors, and calculating the swing period and rotary inertia of the swinging mechanism;

3) disposing the test model 4 on the rotary table, recording data of the pressure sensors, and calculating the weight of the test model according to the recorded data, when the weight fails to meet test requirements, employing a mold weight to adjust the weight;

4) measuring the horizontal distance between two suspension pins on the swing mechanism, assuming a reference plane vertical to the longitudinal direction of the test model, measuring the distance between the reference plane and one of the two suspension pins, reading data of the pressure sensor close to the other suspension pin, and based on the moment balance principle, calculating the distance between the longitudinal center-of-gravity position of the test model and the reference plane, to determine the longitudinal center-of-gravity position of the test model; rotating the rotary table at an angle of 90 degrees, and determining the transverse center-of-gravity position of the test model following operations of determining the longitudinal center-of-gravity position of the test model;

allowing the longitudinal section in the center plane of the test model to be vertical to the reference plane, allowing the center-of-gravity of the test model and the connecting line of tail ends of the two suspension pins to be on the same vertical surface, exerting an external force on the swinging mechanism to deflect the swinging mechanism, and based on the weight and the vertical center-of-gravity position of the swing mechanism as well as the weight of test model, calculating the vertical center-of-gravity position of the test model using the moment balance principle; and 5) exerting an external force on swing the device, recording the data of the angle sensor, calculating the swing period of the device, and calculating the total inertia moment of the device; based on the inertia of the swinging mechanism, the weight and center-of-gravity positions of the test model, calculating an inertia of the test model.

Advantages of the device and method for measuring and adjusting the inertia of a test model of an offshore structure of the disclosure are summited as follows:

The device can be assembled, disassembled, transported, and stored.

The test model is placed on the rotary table and can rotate in multiaxial direction, which reduces the operation difficulty.

The measurement method is efficient and accurate.

In the drawings, the following reference numbers are used: 1, supporting mechanism; 2, swinging mechanism; 3, rotating mechanism; 4, test model; 5, support frame; 6, base frame; 7, bracket; 7a, locating pin; 7b, groove; 8, bracket support; 9, suspension pin; 10, first swing frame; 10a, first sleeve rod; 11, second swing frame; 11a, second sleeve rod; 12, rotary table base; 12a, third sleeve rod; 12b, axle hole; 13, fastening bolt; 14, spring pin; 15, rotary table; 15a, radial supporting rod; 16, rotating shaft; 17, through hole; 18, angle sensor; 19, pressure sensor; 20, signal acquisition unit.

DETAILED DESCRIPTION

To further illustrate, experiments detailing a device for measuring and adjusting the inertia of a test model of an offshore structure are described below. It should be noted that the following examples are intended to describe and not to limit the description.

Figure 1:
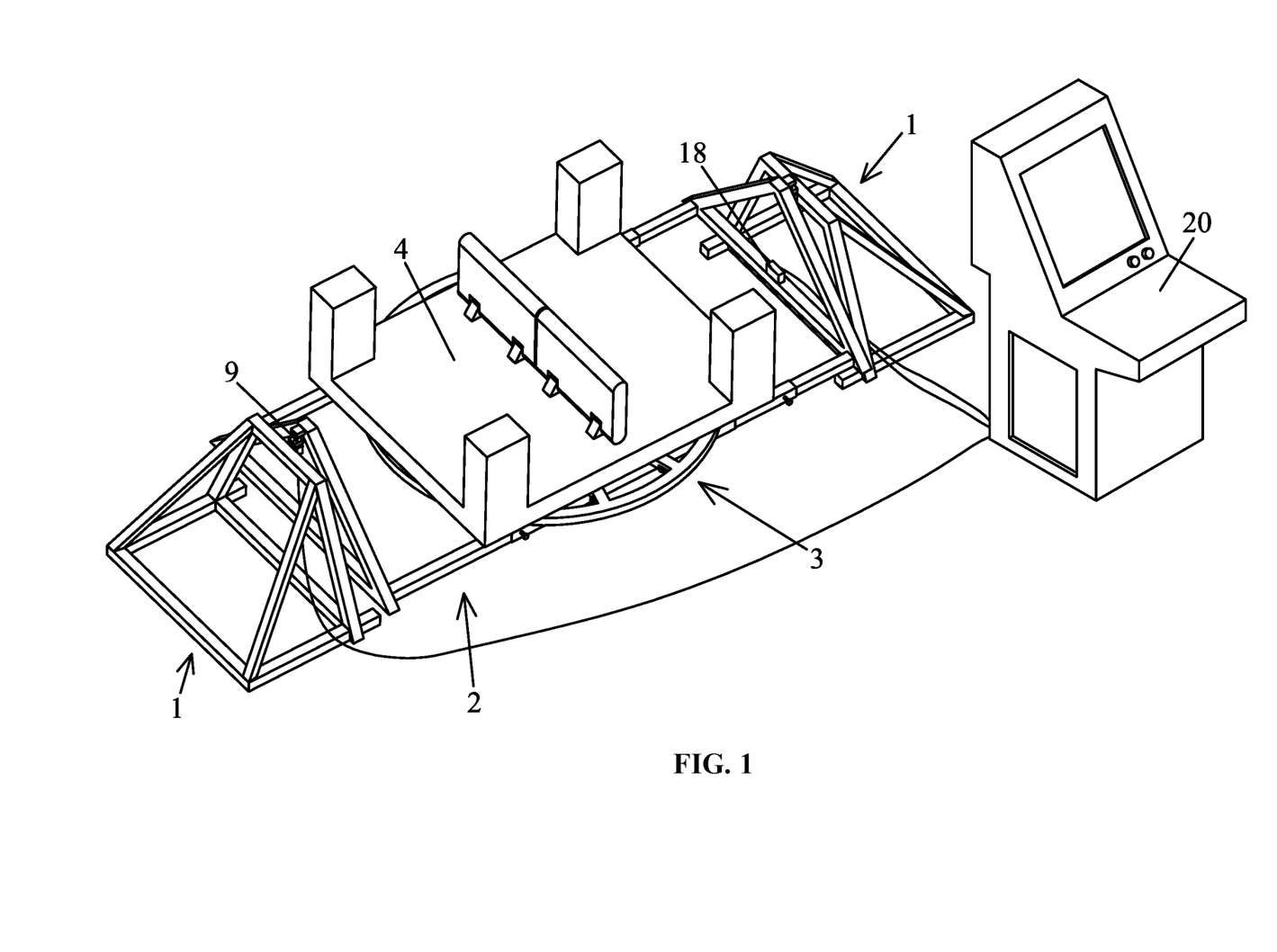
FIG. 1 is a schematic diagram of a device for measuring and adjusting the inertia of a test model of an offshore structure in the disclosure.
Figure 2:
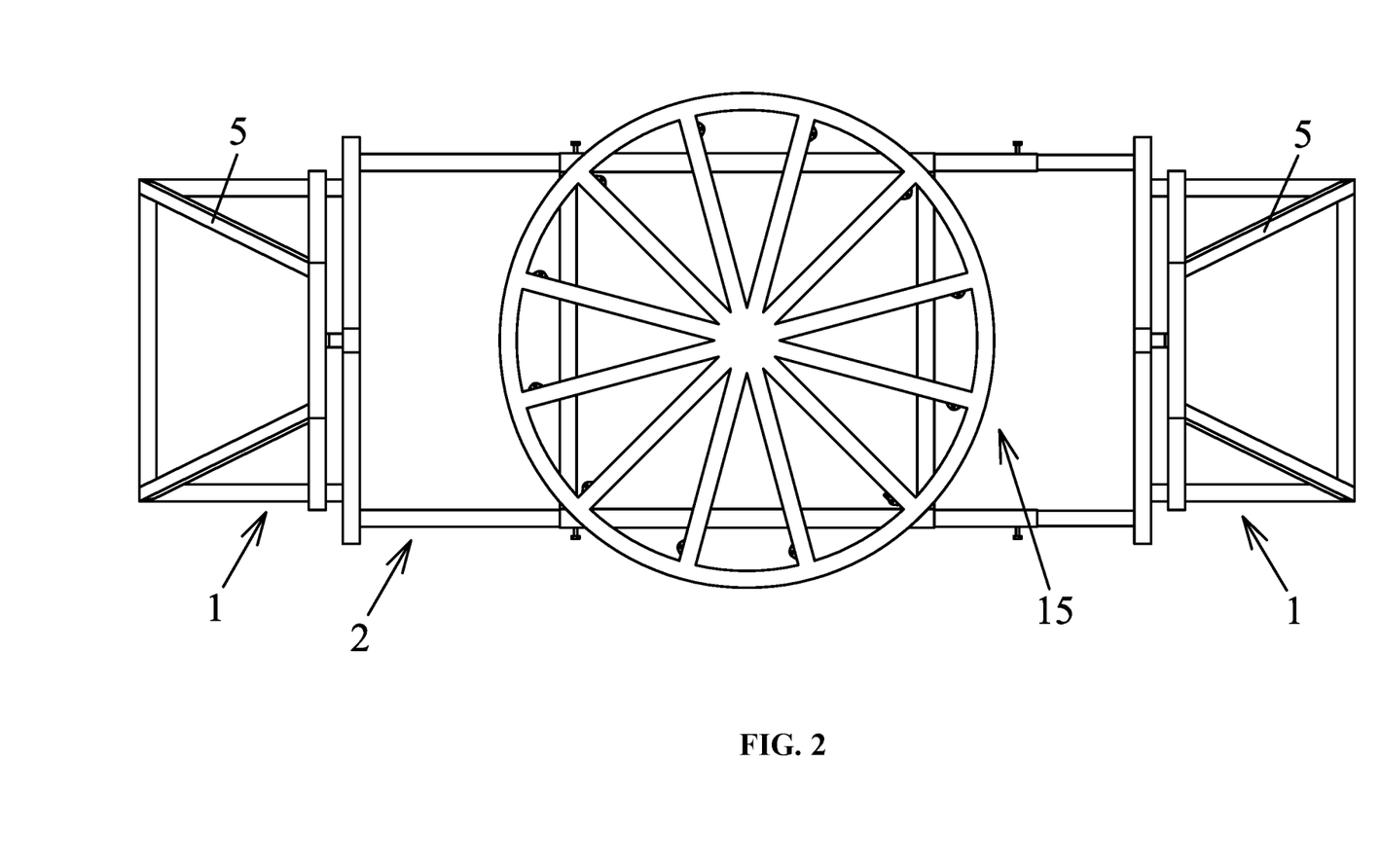
FIG. 2 is a bottom view of a device for measuring and adjusting the inertia of a test model of an offshore structure in the disclosure.
Figure 3:
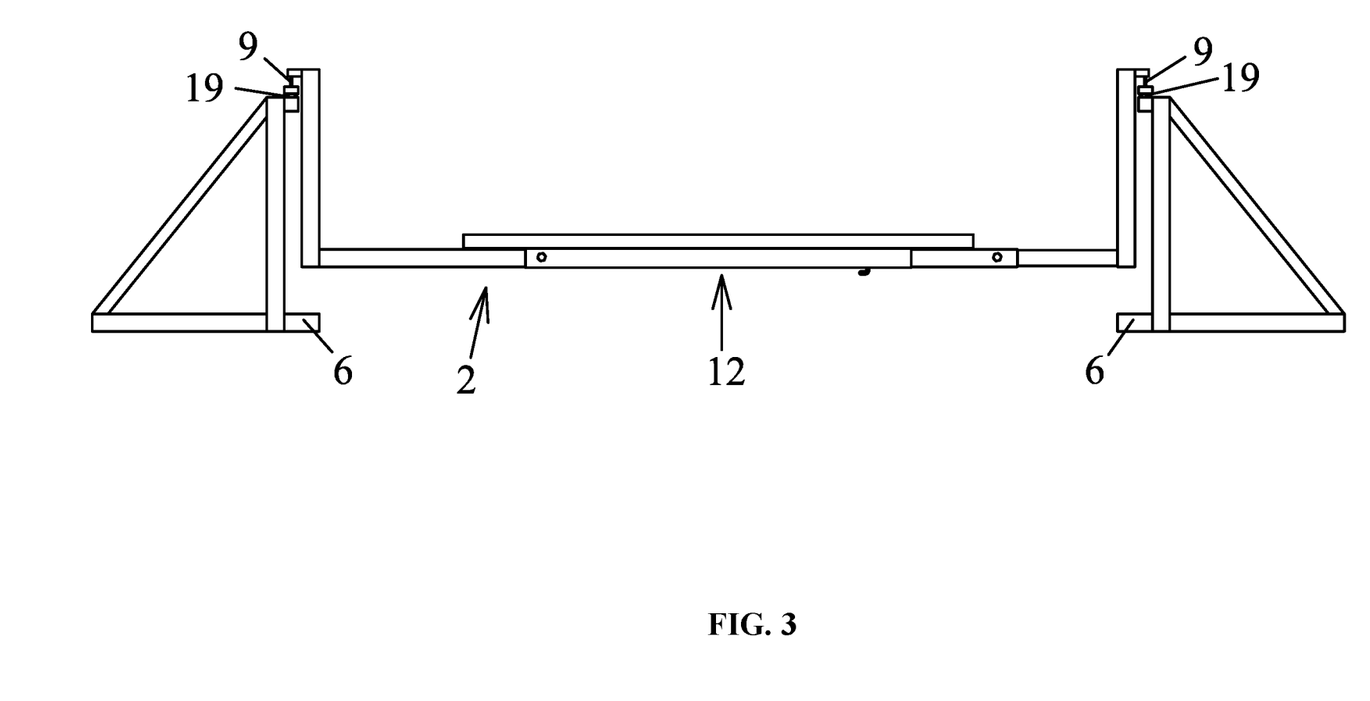
FIG. 3 is a top view of a device for measuring and adjusting the inertia of a test model of an offshore structure in the disclosure.

FIG. 1, FIG. 2, FIG. 3 illustrate a device for measuring and adjusting the inertia of a test model of an offshore structure. The device comprises supporting mechanisms 1, a swinging mechanism 2, a rotating mechanism 3 and a measuring instrument. The supporting mechanisms 1 are symmetrically disposed at two ends of the swing mechanism. The swinging mechanism 2 is connected to the supporting mechanisms 1 through suspension pins 9. The swinging mechanism can swing freely on the supporting mechanisms. The arrangement of the suspension pins reduces the swing damping and improves the measurement accuracy. The rotating mechanism 3 comprises a rotating shaft 16, and the rotating mechanism is connected to the rotary table base 12 of the swinging mechanism 2 through the rotating shaft 16. A rotary table 15 is deposed on the rotary table base 12. A test model 4 is placed on the rotary table 15 and can rotate around the axis. To measure the multiaxial rotary inertia of the test model 4, the angle sensor 18 and the pressure sensor 19 of the measuring instrument are connected to a signal acquisition unit 20, so that data can be processed conveniently and quickly.

Figure 4:
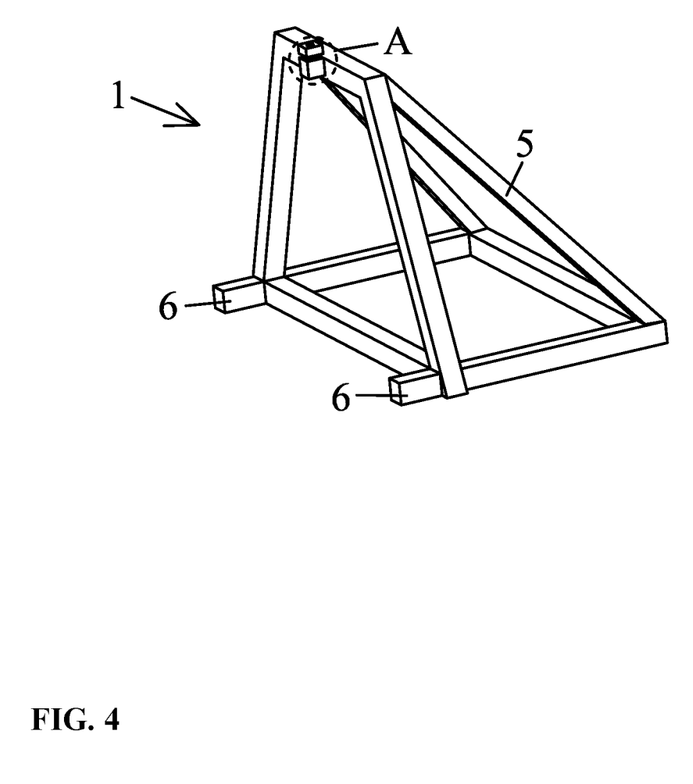
FIG. 4 is a schematic diagram of a supporting mechanism in the disclosure.
Figure 5:
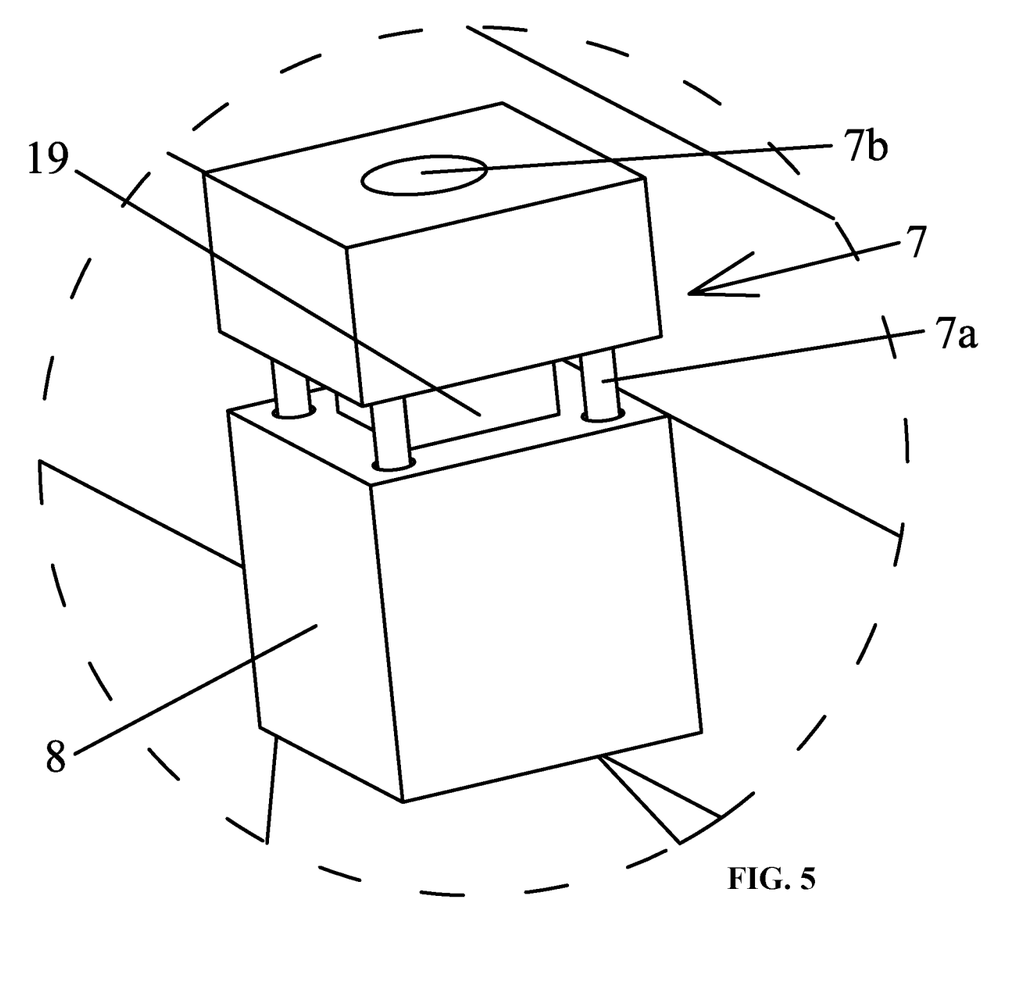
FIG. 5 is an enlarged view of part A in FIG. 4 in the disclosure.

FIG. 4 and FIG. 5 illustrate structure diagrams of the supporting mechanisms 1. The supporting mechanisms 1 are symmetrically disposed at two ends of the swing mechanism, and each supporting mechanism comprises a support frame 5, a base frame 6, a bracket 7 and a bracket support 8. The support frame 5 and the base frame 6 employ square tubes. The support frame is disposed on the base frame 6. The bracket support 8 is disposed on the support frame 5; the bracket 7 is slidably disposed on the bracket support 8 via four locating pins 7a; and a groove 7b is disposed on the top surface of the bracket. The pressure sensor 19 is disposed between the bracket and the bracket support to measure the weight of the test model 4. The suspension pin 9 is inserted in the groove 7b of the bracket 7 of the support frame to connect the supporting mechanisms and the swing mechanism.

Figure 6:
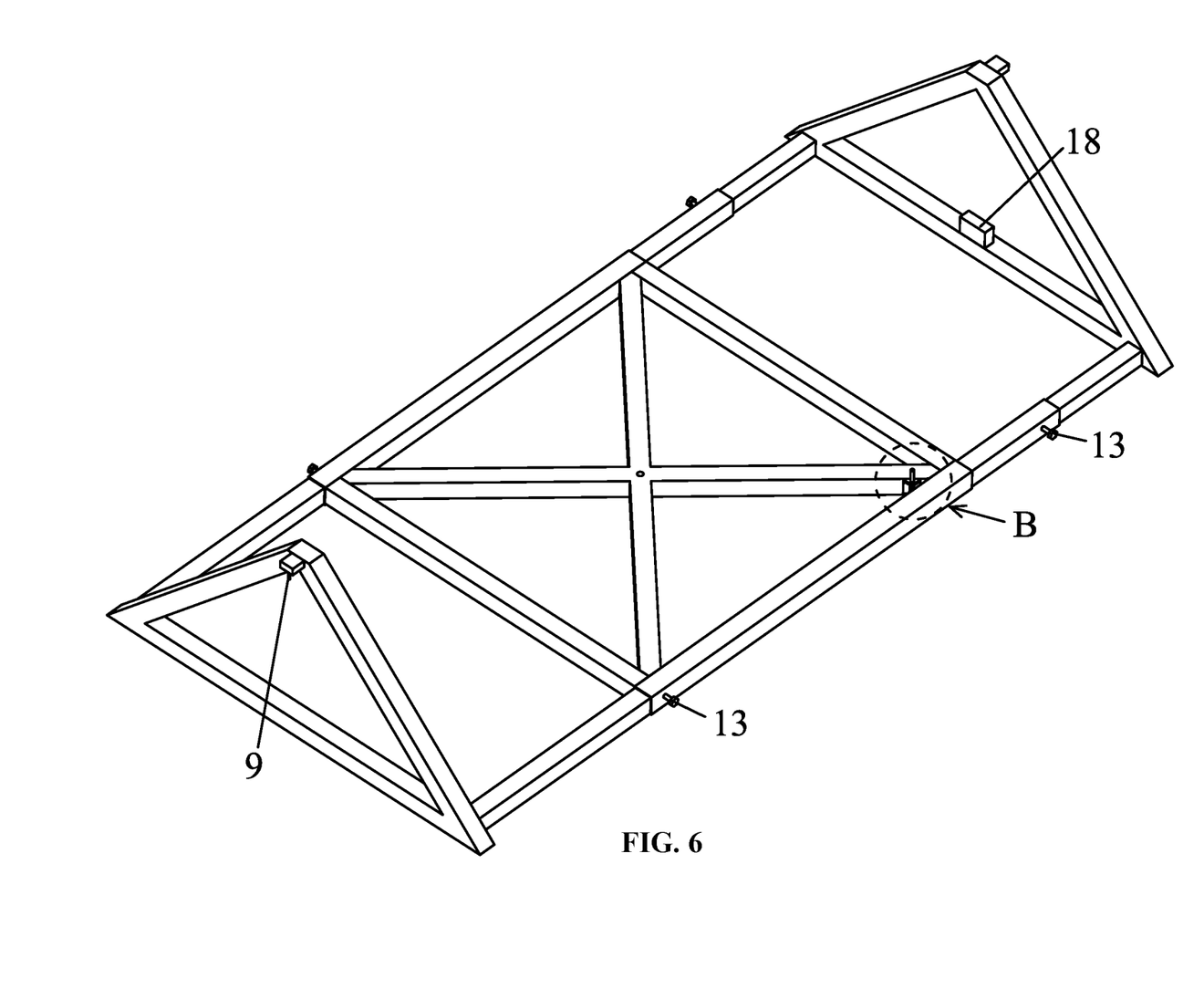
FIG. 6 is a schematic diagram of a swing mechanism in the disclosure.
Figure 7:
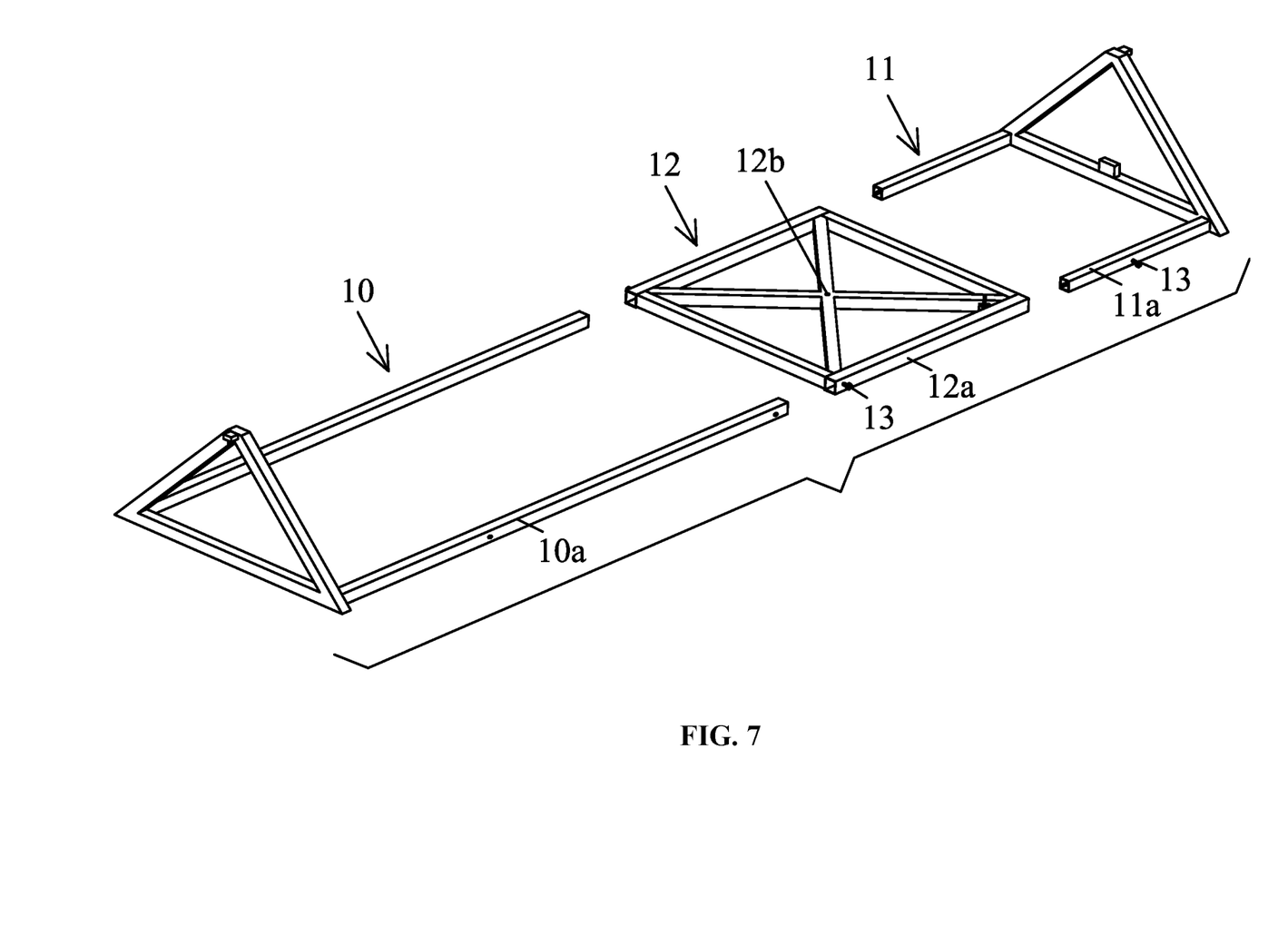
FIG. 7 is an exploded view of a swing mechanism in the disclosure.
Figure 8:
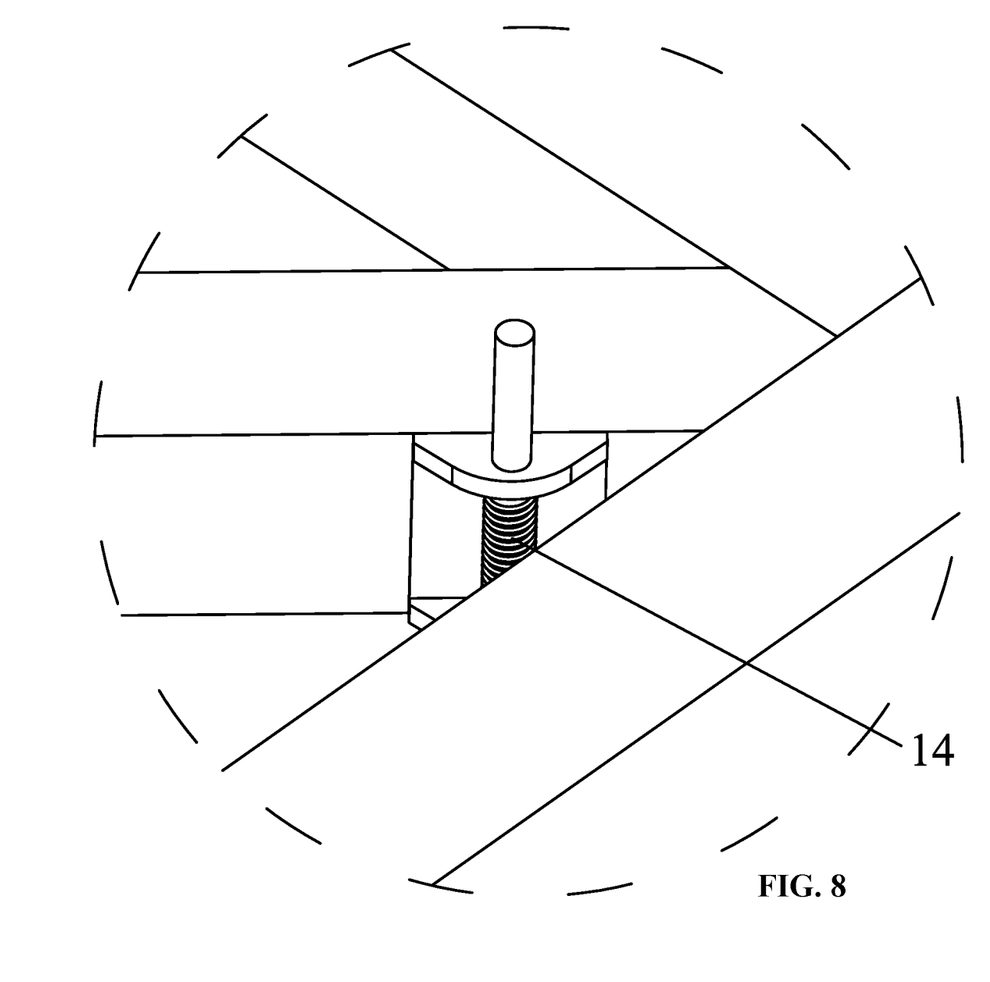
FIG. 8 is an enlarged view of part B in FIG. 6 in the disclosure.

FIG. 6, FIG. 7, and FIG. 8 illustrate schematic diagrams of the swinging mechanism 2. The swinging mechanism 2 is of a hollow square tube structure and mainly comprises a first swing frame 10, a second swing frame 11 and a rotary table base 12 disposed between the first swing frame and the second swing frame. The angle sensor 18 is fixed on the swinging mechanism and can move together with the swinging mechanism, and then the angular variation of the swinging mechanism 2 along with time can be measured. The first swing frame 10 and the second swing frame 11 each comprises a vertically disposed triangle member, and the suspension pin 9 is disposed at a vertex of the triangle member as connecting points of the supporting mechanisms 1 and the swing mechanism 2. The first swing frame comprises a first sleeve rod 10a, and the second swing frame comprises a second sleeve rod 11a. The first sleeve rod 10a is slightly thicker than the second sleeve rod 11a. The rotary table base 12 is centrosymmetric, and comprises an axle hole 12b, a third sleeve rod 12a, a side wall, and a spring pin 14 disposed on the side wall; the first sleeve rod 10a and the second sleeve rod 11a are inserted in the third sleeve rod 12a, and then are locked using fastening bolts. The length of the swinging mechanism 2 is adjustable.

Figure 9:
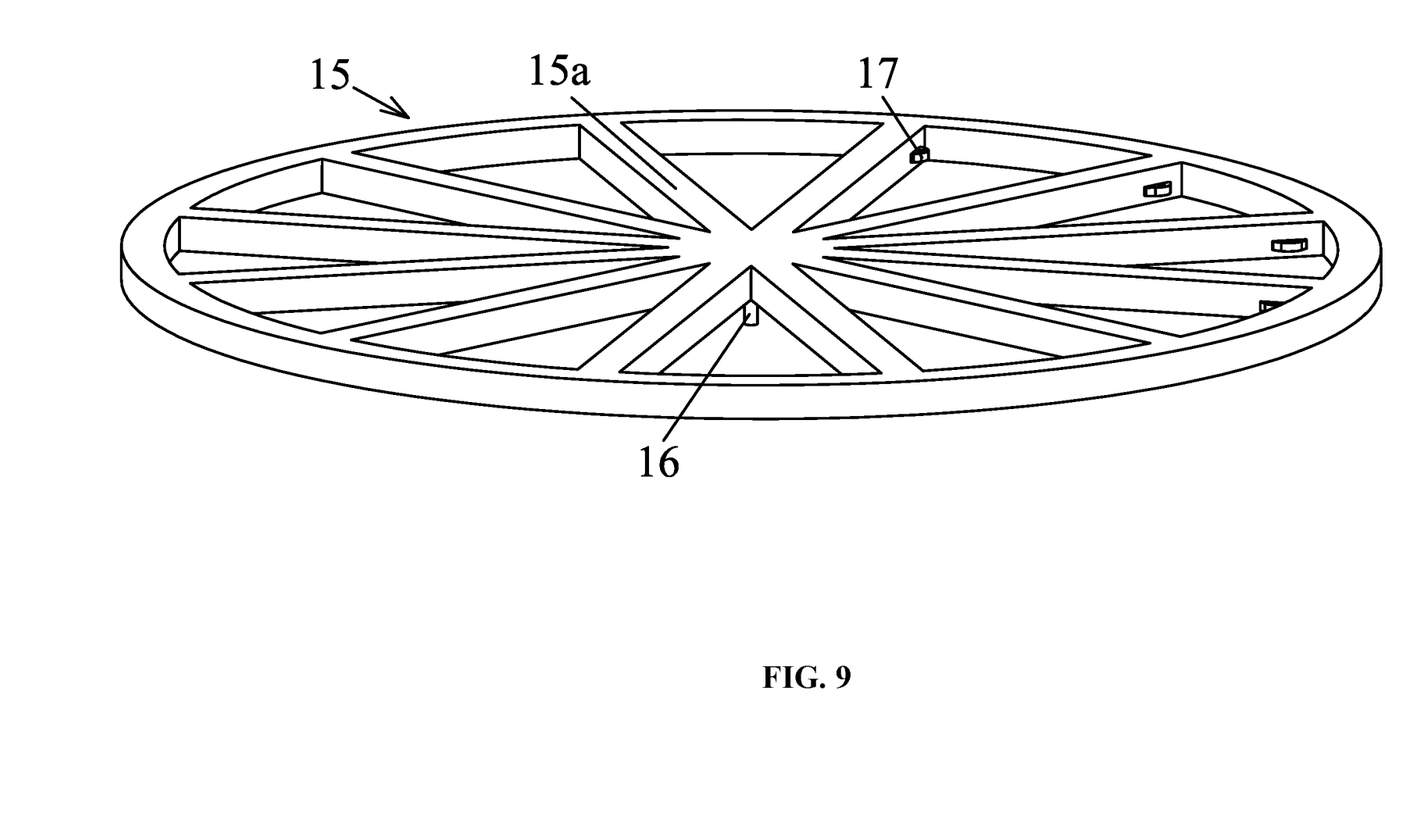
FIG. 9 is a schematic diagram of a rotating mechanism in the disclosure.

FIG. 9 illustrates the rotating mechanism 3. The rotating mechanism 3 comprises a rotary table 15. The rotary table 15 is wheel-shaped and comprises a rotating shaft 16 and a plurality of radial supporting rods 15a. The radial supporting rods 15a are arranged inside the rotary table at intervals of 30 degrees. The rotating shaft 16 is arranged at the lower part of the center of the rotary table 15, can be inserted in the axle hole 12b in the rotary table base 12. The side wall of each radial supporting rod 15a is provided with a protrusion, and the protrusion comprises a through hole 17. The spring pin 14 of the rotary table base 12 is inserted in the through hole 17 to fix the rotary table base 12 and the rotary table 15.

The method of using the device for measuring and adjusting the inertia of the test model of the offshore structure is described as follows:

(a) assembly of the device for measuring and adjusting the inertia of a test model of an offshore structure Measuring transverse and longitudinal lengths of the test model 4, and determining a length of the swinging mechanism according to the longitudinal length of the test model; centering the rotary table base 12 on the swing mechanism 2; connecting and fixing the first swing frame 10, the second swing frame 11, and the rotary table base 12 using the fastening bolt 13 according to the length of the swinging mechanism; disposing the angle sensor 18 on the first swing frame 10; installing the pressure sensor 19 between the bracket 7 and the bracket support 8; connecting the angle sensor and the pressure sensor to a signal acquisition unit 20; disposing and fixing the rotating mechanism 3 on the rotary table base 12 using spring pins 14; hoisting the swinging mechanism 2 and the rotating mechanism 3 on the supporting mechanisms 1.

(b) Measuring the weight, vertical center-of-gravity position, and inertia of the swinging mechanism 2

Recording data on the pressure sensor 19 and calculating the weight of the swinging mechanism 2; exerting a constant force on the swinging mechanism 2 to deflect the swinging mechanism 2, and calculating a vertical center-of-gravity position of the swinging mechanism 2 according to a moment balance principle; exerting an external force on the swinging mechanism 2 to swing the swinging mechanism 2, recording data of the angle sensors 18, and calculating a swing period and rotary inertia of the swinging mechanism.

(c) Measuring and adjusting the weight of the test model 4

Disposing the test model 4 on the rotary table 15, recording data of the two pressure sensors, and calculating the weight of the test model according to the recorded data, when the weight fails to meet test requirements, employing a mold weight to adjust the weight.

(d) Determining and adjusting the center-of-gravity position of the test model 4

To measure the center-of-gravity position longitudinally (along the length direction of the device), measuring a horizontal distance between two suspension pins 9 on the swing mechanism, assuming a reference plane vertical to a longitudinal direction of the test model 4, measuring a distance between the reference plane and one of the two suspension pins 9, reading data of the pressure sensor 19 close to the other suspension pin, and based on the moment balance principle, calculating a distance between a longitudinal center-of-gravity position of the test model and the reference plane, to determine the longitudinal center-of-gravity position of the test model; rotating the rotary table 15 at an angle of 90 degrees, and determining a transverse center-of-gravity position of the test model following operations of determining the longitudinal center-of-gravity position of the test model; allowing a longitudinal section in a center plane of the test model to be vertical to the reference plane, allowing the center-of-gravity of the test model and a connecting line of tail ends of the two suspension pins to be on the same vertical surface, exerting an external force on the swinging mechanism 2 to deflect the swinging mechanism, and based on the weight and the vertical center-of-gravity position of the swing mechanism 2 as well as the weight of test model, calculating a vertical center-of-gravity position of the test model using the moment balance principle. When the center-of-gravity positions of the test model fail to meet the test requirement, adjust the position of the mold weight in the test model.

(e) Measuring the inertia of the test model 4

Exerting an external force on swing the device, recording the data of the angle sensor 18, calculating a swing period of the device, and calculating a total inertia moment of the device; based on the inertia of the swinging mechanism 2, the weight and center-of-gravity positions of the test model, calculating an inertia of the test model.

(f) After the measurement operation is finished, disassembling and maintaining the measurement and adjustment device.

Unless otherwise indicated, the numerical ranges involved include the beginning and end values. It will be obvious to those skilled in the art that changes and modifications may be made, and therefore, the aim in the appended claims is to cover all such changes and modifications.

What is claimed is:

1. A device, comprising:
   a measuring instrument, the measuring instrument comprising an angle sensor and a pressure sensor;
   supporting mechanisms;
   a swinging mechanism; and
   a rotating mechanism;
   wherein:
   the supporting mechanisms are symmetrically disposed at two ends of the swing mechanism;
   the supporting mechanisms each comprise a support frame, a base frame, a bracket and a bracket support; the support frame is disposed on the base frame; the bracket support is disposed on the support frame; the bracket is slidably disposed on the bracket support via locating pins; and a groove is disposed on a top surface of the bracket;
   the swinging mechanism comprises a first swing frame, a second swing frame, and a rotary table base disposed between the first swing frame and the second swing frame; the first swing frame and the second swing frame each comprises a vertically disposed triangle member, and a suspension pin is disposed at a vertex of the triangle member; the suspension pin is disposed in the groove of the bracket of the support frame to connect the supporting mechanisms and the swing mechanism; the first swing frame comprises a first sleeve rod, and the second swing frame comprises a second sleeve rod; the rotary table base is centrosymmetric, and comprises an axle hole, a third sleeve rod, a side wall, and a spring pin disposed on the side wall; the first sleeve rod and the second sleeve rod are disposed in the third sleeve rod, and the first sleeve rod, the second sleeve rod, and the third sleeve rod are connected to each other via fastening bolts;
   the rotating mechanism comprises a rotary table; the rotary table is wheel-shaped, and comprises a rotating shaft and a plurality of radial supporting rods; the rotating shaft of the rotary table is disposed in the axle hole of the rotary table base; a side wall of each radial supporting rod comprises a protrusion, the protrusion comprises a through hole, and the spring pin of the rotary table base is disposed in the through hole to fix the rotary table base and the rotary table;

the angle sensor is disposed on the swing mechanism, and the pressure sensor is disposed between the bracket and the bracket support; and the angle sensor and the pressure sensor communicate with a signal acquisition unit.

2. The device of claim 1, wherein the support frame and the base frame comprise hollow square tubes.

3. The device of claim 1, wherein four locating pins are disposed between the bracket and the bracket support.

4. The device of claim 1, wherein an included angle between two adjacent radial supporting rods is 30 degrees.

* * * * *